Hosmer L. Blum
INVENTOR

BY Edmund W. E. Kamm
ATTORNEY.

Dec. 9, 1941.　　　　H. L. BLUM　　　　2,265,508
FLUID METER
Filed Dec. 6, 1937　　　　4 Sheets-Sheet 2
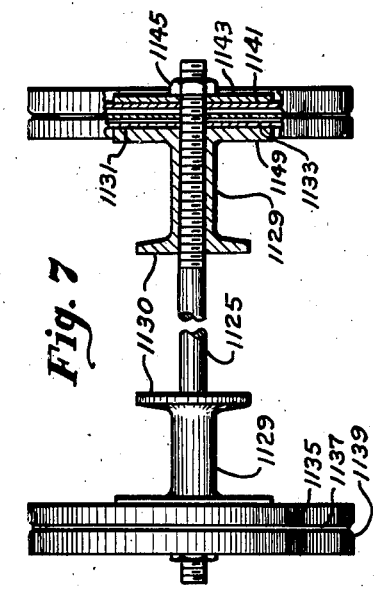
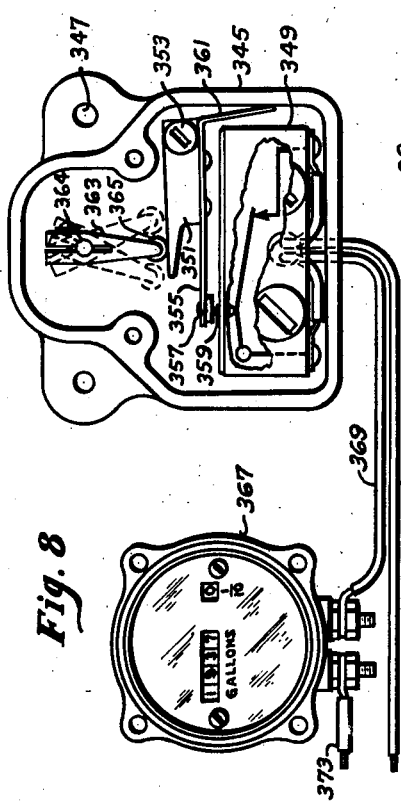
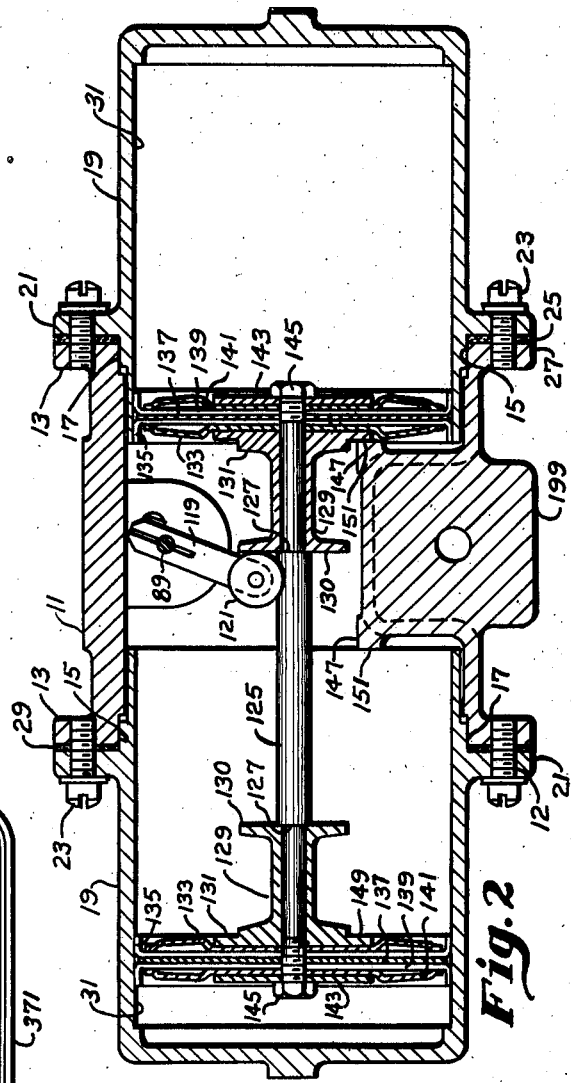
Homer L. Blum
INVENTOR.
BY Edmund W. E. Kamm
ATTORNEY.

Dec. 9, 1941.  H. L. BLUM  2,265,508
FLUID METER
Filed Dec. 6, 1937  4 Sheets-Sheet 3
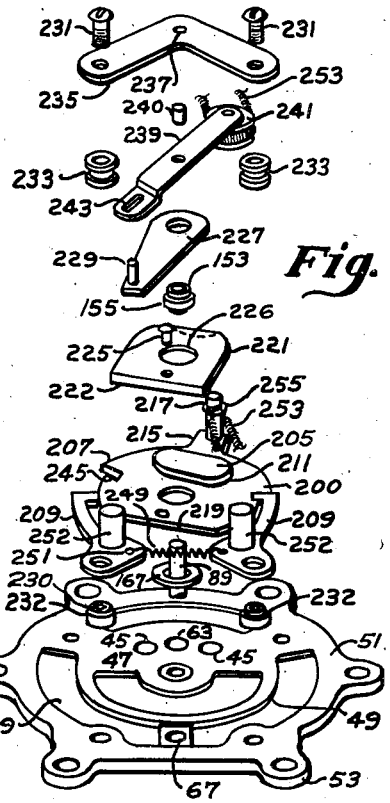
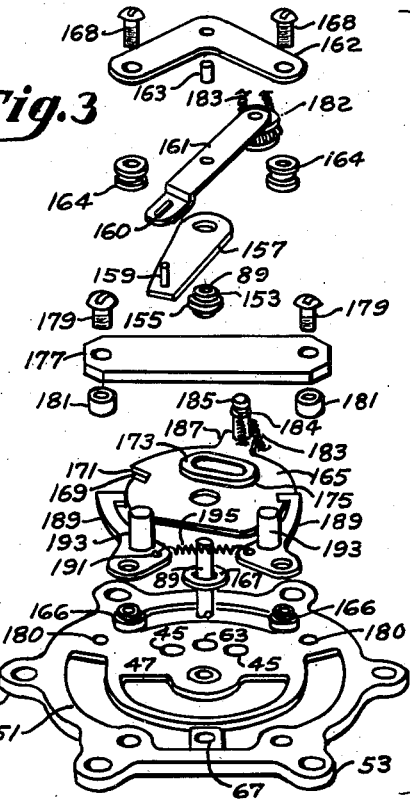
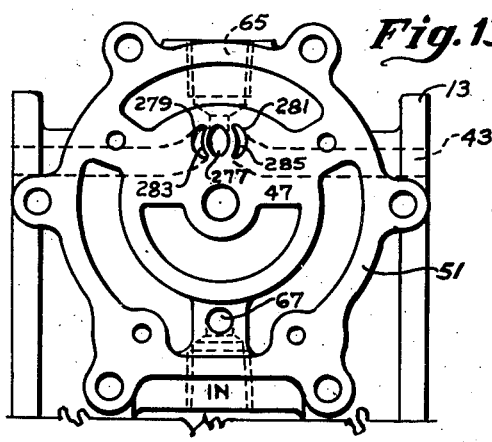
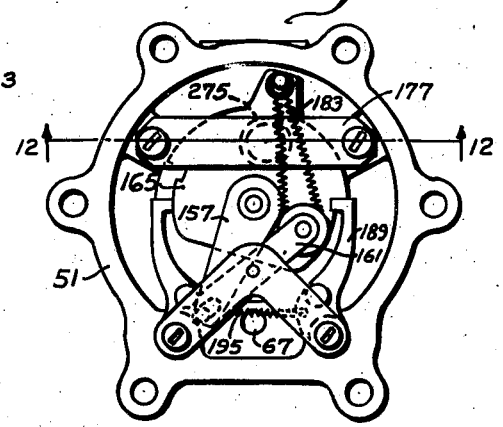
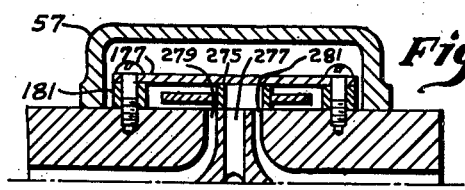
Hosmer L. Blum
INVENTOR.
BY Edmund W. C. Kamm
ATTORNEY.

Dec. 9, 1941.   H. L. BLUM   2,265,508
FLUID METER
Filed Dec. 6, 1937   4 Sheets-Sheet 4
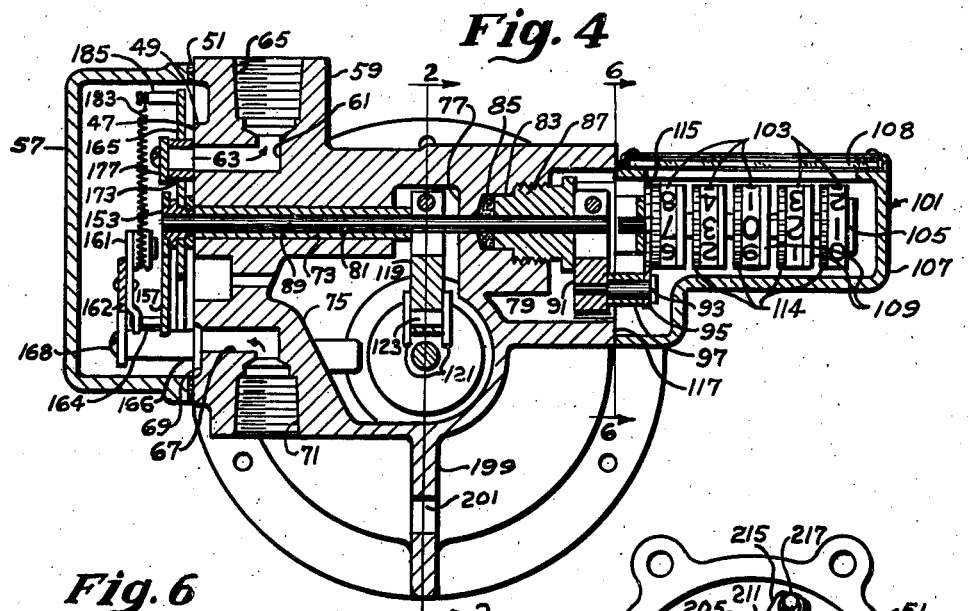
Fig. 4
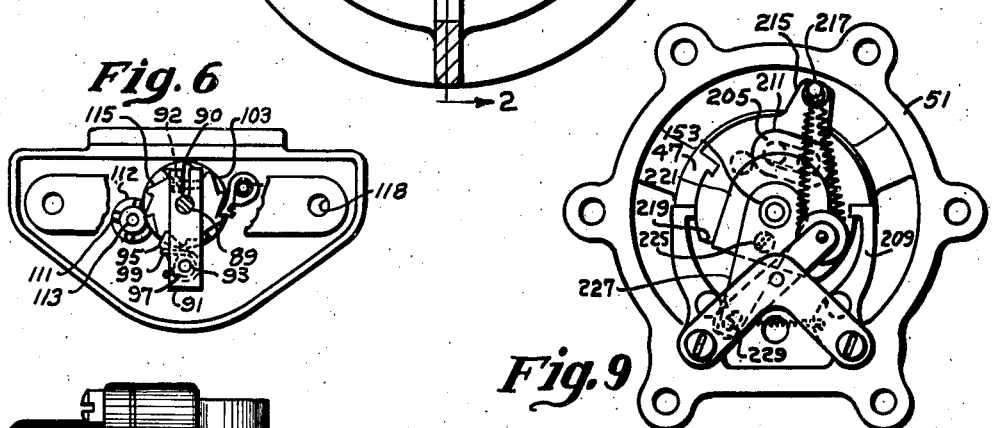
Fig. 6
Fig. 9
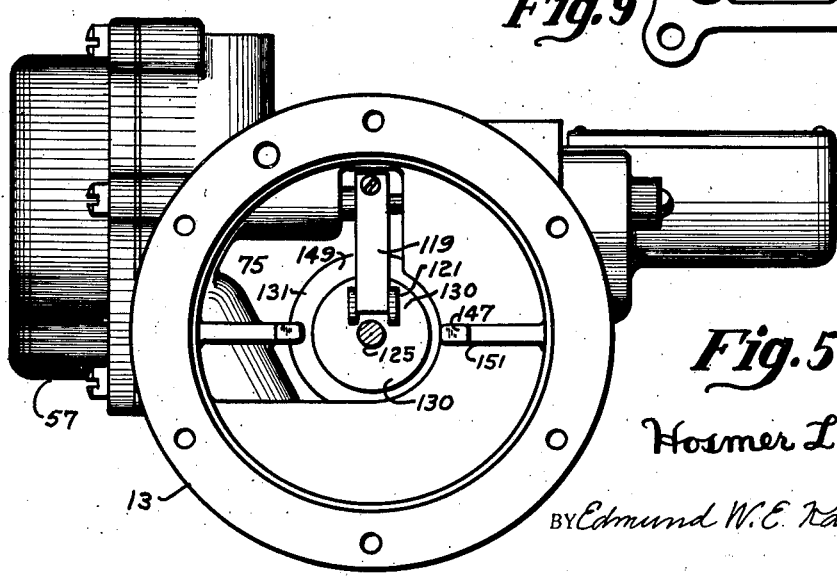
Fig. 5
Hosmer L. Blum
INVENTOR.
BY Edmund W. E. Kamm
ATTORNEY.

Patented Dec. 9, 1941

2,265,508

UNITED STATES PATENT OFFICE 2,265,508

FLUID METER

Hosmer L. Blum, Fort Wayne, Ind.

Application December 6, 1937, Serial No. 178,259

8 Claims. (Cl. 73—251)

This invention relates to an improved fuel meter and has for one of its principal objects a provision of means for measuring the flow of liquid fuels in a more accurate manner than has heretofore been considered possible.

This application is an improvement over the device disclosed in my application Serial Number 118,489, filed December 31, 1936, for Fluid meters.

One of the important objects of this invention is to provide a liquid flow meter particularly adapted for use in measuring fluids such as fuels which is so constructed that it will accurately measure the amount of fluid passing therethrough regardless of the rate of flow.

Various attempts have been made to produce meters which are adapted for measuring small flows of liquid passing to equipment in which the liquid is handled or consumed. A specific instance of a meter of this type is one which is used for measuring the flow of fuel to internal combustion engines such as are used in automotive, marine and aeronautic work and in some classes of stationary work.

The use of meters to measure the amount of fuel consumed is desired in some cases to determine the most economic methods of operation of the engine; in other cases it is desired to maintain a constant check upon the state of repair of the engine by checking its efficiency; and in other cases it is desired to insure accuracy of the records pertaining to the operation of the engine especially where there are various units in service. Other benefits and applications are readily apparent apart from those which are recited above by way of illustration.

The minimum rate of flow of fuel in an ordinary gasoline consuming automobile truck engine is quoted by manufacturers of such vehicles as being approximately a quart an hour when the engine is idling. This flow must be delivered with reasonable accuracy if the meter is to perform the functions outlined in the preceding paragraph. The severity of this requirement can be appreciated when it is noted that the minimum rate of flow which can be measured with reasonable accuracy by commercial meters now on the market is sixty quarts an hour, or sixty times as fast as the permissible minimum rate of flow in the class of work under consideration.

The liquid pressures available in the installations contemplated above vary from one half to perhaps four pounds; consequently, the head loss through the meter must be minimized to prevent any interference with the operation of the apparatus to which the meter is applied. The head loss must also be held to a minimum to reduce slippage of fluid past the measuring mechanism and to prevent undue frictional resistance to motion in the valve parts. It will be appreciated that slippage would cause a considerably greater percentage of inaccuracy in meters operating at slow rates of flow than in those operating at greater rates of flow.

A meter which is designed for the purposes set forth above must in many cases operate under conditions of severe vibration and in every conceivable position. It is therefore a matter of strict necessity that the parts be snugly fitted. It is further impractical on this account to use floats or gravity type measuring chambers.

It should be appreciated that to accurately perform the task of measuring liquids under conditions, some of which are pointed out above, a meter must be a refined instrument. In other words the ability to perform will depend to a considerable extent upon the refinements incorporated in it.

One of the objects of my invention is to provide a liquid meter which is adapted for accurate operation under low pressures and at low rates of flow.

Another object of my invention is to provide a meter having a measuring mechanism of the positive displacement type and having a substantially instantaneously acting valve for controlling the flow of fluid to and from the measuring mechanism.

Yet another object of my invention is to provide a substantially instantaneously operating valve in which a yieldable valve operating member is stressed during a stroke of the measuring means and in which the valve is restrained against motion until the stroke of the measuring means is substantially completed.

Still another object of my invention is to provide a freely operating liquid meter having a quick acting valve mechanism in which the pressure on the valve is reduced to a minimum.

Other objects will become apparent from a study of the description and the accompanying drawings in which:

Figure 2 is a sectional view taken on the line 2—2 of Figure 4 showing the piston structure and cylinders in assembled relation with the body member.

Figure 3 is an exploded view of the valve mechanism shown in Figure 1.

Figure 4 is a sectional view taken on the line 4—4 of Figure 1 showing the valve and register operating mechanism and the fluid passages.

Figure 5 is an end elevation of the body member taken substantially on the line 5—5 of Figure 1 and with the piston omitted showing the relation of the stroke limiting mechanism.

Figure 6 is an elevation taken partly in section along the line 6—6 of Figure 4 showing the counter operating mechanism.

Figure 7 is an elevation partly in section showing a modified form of a piston unit having provision for adjustment.

Figure 8 is an elevation showing an electric registering mechanism adapted for use with the meter instead of the registering mechanism of Figure 4.

Figure 9 is an elevation of another form of valve mechanism adapted for use with the meter instead of the valve mechanism shown in Figures 1 and 3.

Figure 10 is an exploded view of the valve of Figure 9.

Figure 11 is a plan view showing a valve and port arrangement for a minimum motion balanced valve and maximum port area.

Figure 12 is a sectional view taken on the line 12—12 of Figure 11.

Figure 13 is a plan view of the valve seat and ports of the modification shown in Figure 11.

Figure 14 is a perspective view of the valve element used with the mechanism of Figure 10.

Figure 15 is a perspective view of the valve element used with the mechanism of Figure 3.

Figure 1:
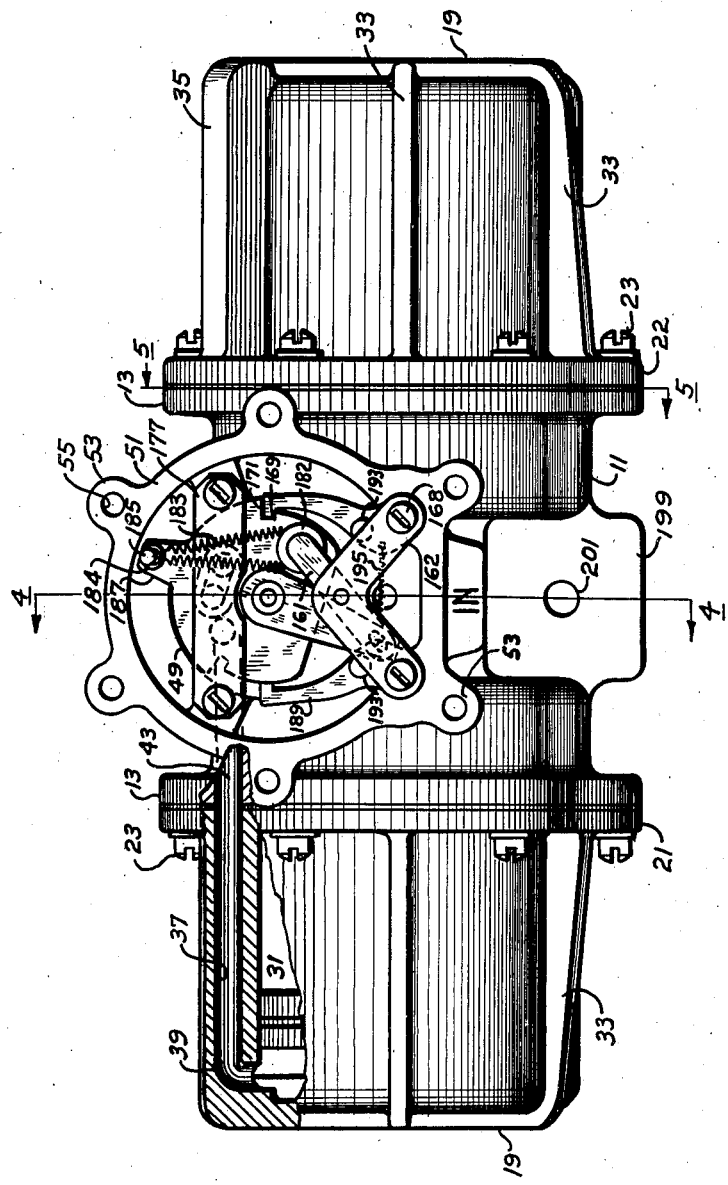
Figure 1 is an elevation with parts broken away showing the meter and one form of the balanced valve.

Referring to Figures 1 and 2, the numeral 11 indicates the central body member of the meter which forms the nucleus about which all of the other elements which form the meter are assembled and upon which they are mounted. The body is preferably die cast and is machined to receive the above referred to elements.

As shown in Figure 2, the body is provided with radial flanges 13 and counterbored at 15 to receive the finished guide portions 17 of the cylinders 19. The cylinders are preferably die cast and provided with flanges 21 which extend radially and substantially parallel with flanges 13. Perforations 12 in the cylinder flanges are disposed in alignment with tapped holes in the flanges 13 and cap screws 23 hold the finished radial surfaces 25 and 27 of the flanges 21 and 13 respectively in sealing relation with a gasket 29 which may be of cork or any other suitable gasket material.

The cylinder castings are bored at 31 to provide smooth walled cylinders which are of uniform diameter throughout their lengths, and the diameters of the cylinders are held to very close limits of tolerance. Reinforcing ribs 33 are formed on the outer surfaces of the castings, and a rib 35 of substantial width and thickness formed on each casting is cored longitudinally to form a fluid conduit 37 which communicates with the cylinder through a radially cored hole 39.

Conduits 37 open into the flanges of castings 19 and communicate with conduits 43 in the body member, and holes are provided in the gaskets in alignment with the conduits 37 and 43 to permit fluid to flow from one to the other.

The conduits 43 are deflected at right angles from their course of alignment with conduits 37 and emerge from the body member in valve ports 45 (Figure 3) in a valve seat 47 formed on a substantially circular boss 49 which is disposed midway between the flanges 13 on the body. The valve seat is disposed in a plane which extends substantially perpendicularly to the planes of the flanges.

A flange 51 is formed in radial spaced relation about the boss 49 and is provided with outwardly projecting ears 53 which are provided with threaded openings 55 adapted to receive screws which retain the valve chamber cap 57 (Figure 4) in place.

The flange 51 merges with an upwardly extending boss 59 which lies behind the plane of the valve seat (Figure 4) and which is provided with a downwardly extending conduit 61. The conduit is deflected from its downwardly course into a horizontal one which terminates in a port 63 in the valve seat. Conduit 61 is enlarged at its upper end and is internally threaded as at 65 to receive a standard pipe connection which is formed on the discharge conduit (not shown) which conducts measured liquid from the meter to the discharge receptacle.

A fourth conduit 67 extends upwardly into the lower portion of the body member and in substantial alignment with the conduit 61 and is diverted at right angles to its upward course and opens horizontally into the channel 69 between the boss 49 and the flange 51. The lower portion of the channel is enlarged and threaded internally at 71 to receive a standard pipe connection so that a conduit connected with a liquid supply or a pump may be attached to conduct fluid under pressure to the meter.

The body member is provided with an opening 73 which extends entirely through the body, perpendicularly with respect to the plane of the valve seat and substantially centrally of the boss 49. This opening passes through a branch of the cored opening 75, which is formed in the central portion of the body member, and passes through the wall 77 into chamber 79 which houses a portion of the register operating mechanism.

That portion of the opening 73 between the valve seat and the opening 75 is provided with a bushing 81 while the portion between the wall 77 and chamber 79 is counterbored at 83 and threaded to receive packing 85 and a packing gland 87 which threadedly engages the body member.

A shaft 89 is mounted for rotation in said bushing and stuffing box and has fixed to it, by means of a joint comprising slot 90 and screw 92 at the end extending into chamber 79, a depending pawl carrier 91 to which is pivotally attached, by means of a headed pin 93, a pawl 95. A spacer 97 maintains the pawl in spaced relation to the carrier and a spring 99 encircles the pin and engages the pawl and carrier so as to bias the former for clockwise rotation (Figure 6) about the pin.

A register indicated generally by the numeral 101 comprises counterwheels 103 mounted for free rotation on a shaft 105 which is mounted in a housing 107. Transfer trains connect the counterwheels for operation and comprise Geneva pinions 109 mounted on the counterwheels, Geneva gears 111 mounted on a shaft 113 meshing with the pinions, spur pinions 112 fixed to rotate with the Geneva gears and meshing with spur gears 114 on the adjacent counterwheels. The first counterwheel is provided with a ratchet 115, the spur gear thereon being inoperative, and the ratchet is disposed in the plane of pawl 95 and is advanced thereby at each clockwise rotation of the driving pawl. It is obvious that any desired form of register may be substituted for that just described which is shown merely for the purpose of illustration. The register housing 107 is open at one end and is held in abutting relation with a finished surface 117 on the body member by means of screws or other suitable fastenings which enter the openings 118.

A lever 119 is attached to that portion of shaft 89 which extends through the opening 75 in the body member. The upper end of the lever is broached to receive the shaft and is slotted and fitted with a transverse screw which tends to close the slot and clamp the lever on the shaft. The lower end of lever 119 is provided with an opening which extends parallel with shaft 89 and a pair of rollers 121 are mounted on a shaft 123 which is supported in said opening.

The lever 119 is operated by a piston assembly. A piston rod 125 which is provided with reduced portions forming oppositely facing shoulders 127 near each end of the rod. Spacer members 129 are mounted on the reduced portions of the rod in abutting relation with respect to the shoulders 127, and a flange 130 is formed on each member adjacent the shoulder. At the opposite ends of the members are formed flanges 131 which serve both as stops and as supporting members for the piston forming elements which comprise inner spreaders 133 preferably made of metal, inner leathers 135, spacer or supporting discs 137 of metal or of any desired composition material which is capable of forming a stiff backing for the leathers, outer leathers 139, outer spreaders 141 and washers 143. Nuts 145 are screwed on the threaded ends of the rods to maintain the spacers and the piston forming elements in position against the shoulders 127 on the rods.

Stops 147 are formed integrally with the body member and are positioned to contact the flanges 131. The latter may be faced or finished as indicated by the numeral 149 to contact squarely the finished surfaces 151 of stops 147. It will be seen that by accurately maintaining the distance between the finished surfaces 149 and the distance between the finished surfaces 151 of stops 147, the stroke of the pistons can be accurately regulated.

If desired the piston structure may be modified as shown in Figure 7 to provide for adjustment of the stroke. In this form the piston rod 1125 is of uniform diameter throughout its length and is threaded at each end for a considerable distance to receive internally threaded members 1129 which are formed with operating flanges 1130, spreader supporting flanges 1131, and finished stop surfaces 1149. Inner spreaders 1133, and leathers 1135, spacer discs 1137, outer leathers 1139 and spreaders 1141, washers 1143 and nuts 1145 are assembled on the piston rod in the order mentioned. By screwing the members 1129 toward or away from each other and adjusting the nuts 1145 accordingly, the distance between the respective stop surfaces 1149 and the stop surfaces 151 on the body member may be decreased or increased to decrease or increase the volume displaced by the pistons at each stroke.

*Valve mechanism*

Referring to Figure 4 it will be seen that the end of shaft 89 which passes through bushing 81 extends beyond the body member and has fixed to it a bushing 153 having a flange 155 formed inwardly of the end thereof. A lever 157 is fixed to the bushing 153 outwardly of the flange 155 and extends parallel to and in the same direction as the lever 119 described above. A pin 159 is fixed with one end in the lower end of lever 157 and is pivoted at its other end in a slot 160 the lever 161 which is in turn pivoted on a pin 163 supported on an angle plate 162. This plate is mounted at each side on a plurality of superimposed spacer sleeves 164 and 166 and is held in place on said sleeves by means of screws 168 which enter the plate and sleeves and engage threaded openings in the flange 51 of the body member.

A valve actuator plate 165 is mounted for free rotation about the portion of the bushing 153 between the flange 155 and a retaining collar 167 which is fixed to the bushing. The collar 167 spaces the actuator plate above the plane of the valve seat so that liquid may freely enter the ports 45. The plate is provided with notches 169 the upper edges 171 of which project beyond the lower edges to form stops which are adapted to abut the latch pawls later to be described.

An elliptical open ended member 173 having finished end faces forms the valve.

The internal perimeter and form of the valve is such that two adjacent valve ports 63 and 45 may be encompassed by the valve member at one time. This member is loosely received in an opening 175 in the valve actuator plate 165. The finished end faces of the valve member sealingly engage the valve seat 47 and a balancing plate 177 which is fixed to the body member by means of screws 179 which enter threaded openings 180 in the body member. Spacers 181 are inserted between the body member and the balancing plate to retain it in proper position above the valve member. The function of the balancing plate and spacers is to relieve the valve from the pressure of the incoming fluid thus reducing friction between the valve and its seat so that the valve will not stick to the valve seat. Thus free action of the valve is assured.

The upper end of lever 161 is provided at its inner side with a peripherally grooved roll 182 which serves to retain the loop of a spring 183, the ends of which are attached to a ring 184. A pin 185 is fixed in an upwardly projecting arm 187 on the valve actuator plate and extends outwardly thereof so that a groove in the outer end of the pin will lie in substantially the same plane as the groove of the roll 182. The groove in this pin supports the ring 184 and maintains the spring 183 under tension.

Two allochiral pawls 189 are each pivotally mounted reduced shoulders formed on the upper end of the lower spacer sleeves 166. The pawls are provided with perforations 191 between which is mounted a tension spring 195 which biases the pawls toward the actuator plate 165 and are provided with integral up standing studs 193. The actuator plate and the pawls are disposed in the same plane while lever 157 overlies the pawls so that it will engage the studs 193 at predetermined points in its motion to withdraw the pawls from the notches 169 in the actuator plate.

A mounting lug 199 is formed on the central body between flanges 13 and substantially in the same plane as the lever 119. An opening 201 is formed in the lug to receive a bolt or screw not shown which serves to hold the meter in place on any mount which may be provided.

*Operation*

Liquid under a pressure of one to three and one half or four pounds is admitted through inlet conduit 67, to the valve chamber formed by cap 57 and the body member 11. If we assume that the pistons have just completed the leftward stroke as shown in Figures 1 and 2 and that the valve mechanism has just snapped to the position shown in Figure 1, it will be seen that the liquid under inlet pressure will pass through the left hand port 45, through the left hand conduit 43 in the body and the conduits 37 and 39 in the left hand cylinder 19 and enters the measuring chamber formed by the left hand piston and the bore in the cylinder 31. The piston is forced toward the right and as a result the liquid confined in the right hand measuring chamber is forced out through the right hand conduits 39, 37, 43 and port 45 and into the chamber formed by the valve 173 and the balancing plate 177. Since the valve encompasses both the right hand port 45 and discharge port 63, liquid will pass from the interior of the valve through port 63 and conduit 61 to float chamber of a carburetor or other suitable receptacle.

As the pistons approach the right hand end of the stroke, the flange 130 of the left hand member 129 engages rolls 121 on lever 119 and rotates said lever and shaft 89 in a counterclockwise direction (Figures 1 and 2). The valve operating lever 157 which is attached to shaft 89 is also rotated in a counterclockwise direction and carries with it the lower end of the lever 161 which pivots on its pin 163 in a counterclockwise direction and as the lever 157 continues to rotate, the distance between the pin 185 and roll 182 increases and tensions the spring 183.

Continued rotation of lever 157 will bring its lower end into contact with the stud pin 193 on right hand pawl 189 and the pawl will be rotated in a clockwise direction about its pivot 166 against the action of spring 195 which yieldably holds the pawl in engagement with the valve actuator plate. The pawls and levers comprising the valve operating system are so designed and proportioned that the pawl will be disengaged from the notch 169 at substantially the same instant that the stop surface 149 of the piston element contacts the face 151 of stop 147 on the central body member.

When the actuator plate is released by the stop it will be suddenly rotated in a counter-clockwise direction on bushing 153 under the action of spring 183 which was tensioned as described above. The rotation of the actuator plate is arrested upon engagement of the projecting shoulder 171 on the plate with the left hand pawl 189 which thereupon enters the left hand notch 169 in the plate under the action of spring 195.

In this position of the actuator plate, the valve 173 encompasses the left hand port 45 and the discharge opening 63 so that the right hand opening 45 is connected with the inlet pressure in the chamber under cap 57. Thus the direction of the differential of inlet and outlet pressures on the pistons is reversed and the piston stroke in the leftward direction is begun and continues until the spring 183 is again stressed and the left hand pawl is released. The release occurs at substantially the instant the stop surface 149 on the right hand piston member 129 engages the stop surface 151 of right hand stop member 147 on the body member and the associated parts again assume their original positions as shown in Figures 1, 2, and 3 and the cycle is repeated.

Referring to Figure 6, it will be seen that the pawl carrier 91 which is attached to shaft 89 will complete one cycle of operation at the same time as the pistons and valve parts. The pawl 95 will ride idly over a tooth of ratchet 115 during the counter-clockwise rotation of shaft 89 and will engage said tooth at the end of this movement. The pawl will advance the ratchet the space of one tooth during the ensuing clockwise rotation of the shaft. If the volume of liquid displaced by both pistons in the cycle is for example, one tenth gallon, the first register dial 103 will indicate tenths and will be advanced one step during each cycle. The motion of the tenths dial is transmitted to the units dial through an intermittent transfer mechanism which comprises a Geneva pinion 109 which drives a combination Geneva gear and spur pinion 111, 112 which is mounted for free rotation on a shaft 113. The spur pinion is enmeshed with a spur gear 114 attached to the units dial. The ratio of the gearing is such that one revolution of the tenths dial advances the units dial one step. Similar transfer mechanisms connect adjacent higher order dials. The dials 103 and ratchet 115 are mounted for free rotation about a shaft 105 which is supported in a register case 107. The register dials are visible through a window 108 in the casing.

It is obvious that any desirable register may be provided in the place of that shown and that the ratio of the transfer gearing may be varied without the exercise of invention. Similarly, it is obvious that any suitable ratchet mechanism may be substituted for the single acting ratchet mechanism described in the event that it is desired to register the flow in increments of different magnitudes than those disclosed. Applicant does not therefore desire to be limited to the specific mechanisms here disclosed for the purpose of illustrating the principle of his invention.

*Modified valve structure*

A modified form of valve is disclosed in Figures 9 and 10 in which the valve seat 47 and flange 51 are the same as that disclosed in Figures 1 and 3. The valve actuator plate 200 is mounted for pivotal motion on the bushing 153 of shaft 89 and is provided with an opening 211 in which is loosely fitted the valve 205 Figure 14. The valve comprises an elongated body having an elongated recess of sufficient length to encompass a pair of adjacent valve ports 63 and 45 formed in the valve seat.

A projection 215 is formed on the actuator plate and a pin 217 is fixed in said projection to extend substantially perpendicular to the plane of the plate. The lower edge 219 of the actuator plate is formed straight and a spring plate 221 having a bent over edge 222 which abuts the edge 219 is fixed to the actuator plate by a rivet 225. An opening 226 is formed in the spring plate of sufficient size to clear the flange 155 on the bushing 153. The spring plate extends over the valve 205 and is bent slightly toward it so as to bear against it with an edge, that is, the contact of the plate and valve is a line contact. Thus the valve is held lightly against its seat 47.

Lever 227 is fixed to rotate with bushing 153 and shaft 89 and extends parallel with lever 119 (Figure 4). A pin 229 is fixed in the lower end of the lever and extends away from the actuator plate.

Pawls 209 are mounted to pivot about bearings 230 which are formed by reducing the upper ends of spacer sleeves 232 and are held in place by upper spacer sleeves 233 which in turn are held fast by screws 231 which are supported in holes in flange 51. An angle plate 235 is supported between the upper spacer sleeves 233 and the heads of screws 231 in spaced relation with respect to valve seat. An opening 237 is formed at the apex of the angle plate and a double armed roll bearing lever 239 is pivotally mounted at its center on a pin 240 which is supported in said opening.

One arm of the lever 239 has pivotally mounted thereon a grooved roller 241 while the other end is provided with a slot 243 which extends axially of the lever and is adapted to receive the pin 229 on lever 227.

Notches 245 are formed in opposite edges of the actuator plate and are adapted to alternately receive the pawls 209 when the recess of valve 205 encompasses port 63 and one or the other of ports 45. The upper edges of the notches project outwardly to provide stop means 207 which are adapted to engage the pawls to limit the angular motion of the valve actuator plate.

A spring 249 is fixed with its ends in openings 251, one in each pawl 209 and serves to hold the pawls in engagement with the edge of the valve actuator plate. The lever 227 is of sufficient length to engage pins 252 which are fixed, one in each pawl 209 and serves to move the pawls from their positions in the notches in the actuator plate upon rocking movement of the lever 227.

The ends of a spring 253 are fixed to a ring 255 which is supported by the pin 217 while the central portion of the spring is looped about the grooved roll 241.

*Operation of modified valve mechanism*

As the pistons move in a right hand direction Figure 2, the shaft 89 will be given a counter-clockwise rotation which is transmitted to lever 227. The valve actuator plate is held in the position of Figure 9 by the engagement of right hand pawl 209 and its corresponding notch 245 so that the valve recess 213 will encompass port 63 and right hand port 45 to permit the right hand cylinder to discharge and the left hand one to fill.

The counter-clockwise rotation of lever 227 is transmitted to lever 239 by the pin and slot connection 229—243 and as roll 241 passes the centerline drawn between pin 217 on the actuator plate and the pivot 240 of lever 239, the spring 253 will be stressed and will bias the actuator plate for rotation in a counter-clockwise direction. This rotation is prevented by the engagement of right hand pawl 209 and notch 245.

Lever 227 will eventually contact right hand pin 252, and the parts are so designed that just as the stop face 149 on spacer member 129 (Figure 2) contacts the face 151 of stop 147, the pawl 209 will be withdrawn from its notch 245 in the valve actuator plate and said plate will rotate to its counter-clockwise position which is determined by the contact of projecting shoulder 207 with left hand pawl 209 which thereupon is forced into the corresponding notch 245 by spring 249.

The recess in the valve 205 is thus shifted to encompass port 63 and left hand port 45 so that the left hand cylinder will discharge while the opposite cylinder will fill. As a result the levers 227 and 239 now will be moved in a clockwise direction to bias the valve plate for motion in a clockwise direction and to release the left hand pawl 209 at the end of the piston stroke so that the valve will be moved to its original position as shown in Figure 10 by spring 253 to complete the cycle.

*Electric indicator control*

In some cases it is desirable to control a register located at a distance from the meter. Such a register is usually intermittently operated by a solenoid which is energised at the end of the delivery of a unit quantity of fluid by the meter.

To control such a register, a make and break mechanism such as that shown in Figure 8 may be substituted for the register mechanism 101 shown in Figure 4 by removing the screws from holes 118, removing the register housing 107, removing arm 91, placing a coupling on shaft 89 and screwing the case 345 into the body 11 by inserting screws in the openings 347.

A case 345 is held in place on the central body 11 by means of screws received in openings 347 in the case. In the case is mounted a switch indicated generally by the numeral 349 which may be of the type shown in the Patent Number 1,960,020 to McGall it being understood that any other suitable switch may be used if desired, and that the particular switch is shown only for purposes of illustration.

A rocker arm 351 is pivotally mounted on a screw 353 which is fixedly attached to the case. The rocker has fixed to it by rivets or other suitable fastenings a spring member 355 which carries a tappet 357 disposed above the switch actuator 359. The other end 361 of the spring is bent to engage the casing and serves to retain the rocker arm in its fartherest clockwise position.

A lever 363 is attached to the end of a shaft 364 which is connected by any suitable means so as to be oscillated by the valve actuating shaft 89. The lever 363 is provided with a roller 365 which is adapted to engage the rocker arm and depress it as the lever moves from one dotted line position (Figure 8) to another through the full line position shown. Thus two operations of the switch will be effected during a complete two stroke cycle of the pistons.

If only a single actuation of the switch is desired during a cycle, the lever may be so attached to the shaft 346 that it will occupy the full line position of Figure 8 at the end instead of in the middle of a stroke of the pistons.

The switch is connected to the solenoid (not shown) of the register 367 by a wire 369 and to one side of a source of power by the wire 371. Another lead 373 connects the solenoid to the other side of the source of power or to a ground to complete the circuit.

*Minimum travel valve mechanism*

It is desirable to reduce the amount of valve travel to a minimum to minimize shock in stopping the moving parts of the valve mechanism and to reduce to a minimum the time necessary to effect a valve actuation.

To reduce such travel to a minimum, the valve may be formed as a hollow cylinder 275 as shown in Figures 11 and 12. The outlet port 277 is disposed centrally of the cylinder ports 279 and 281 and sealing walls 283 and 285 separate the ports and are substantially the same width as the valve walls. The walls 283 and 285 are so disposed that they divide the circular area of the valve into two equal parts (Figure 13) thus making ports 277, 279 and 281 of substantially equal area. The shifting motion of the valve to reverse the flow in the meter is only that necessary to cut off the one cylinder port from connection with the outlet port 277 at the same time that the other cylinder port is being connected with it. While, for an instant, all three ports may be connected by the valve, this has no detrimental effect because the shifting of the valve is almost instantaneous and because the pistons are at the end of the stroke at the time the change takes place.

This form of valve is shown in the Figures 11 and 12 as having a balancing plate 177 similar to the form shown in Figure 3. The upper portion of the valve may be closed however if this is desired and the spring 221 of Figure 10 may be used therewith.

It is obvious that numerous changes may be made in the form construction and arrangement of parts without departing from the spirit of the invention and for this reason applicant does not desire to be limited to the specific forms of mechanisms disclosed, but rather to such forms as may fall fairly within the scope of the appended claims.

What applicant considers to be new and desires to protect by Letters Patent of the United States is:

1. In a liquid meter having an inlet for unmeasured liquid and an outlet for measured liquid, measuring means comprising reciprocable displacement means, a valve chamber connected with said inlet, a planar valve seat in said chamber, conduits for connecting said measuring means and said outlet with ports in said valve seat, a slide valve actuable to different positions on said seat with respect to said ports for controlling the passage of liquid through said conduits, means for actuating said valve comprising an element disposed for actuation by said displacement means, a lever system connected for operation by said element, an actuator provided with an opening of substantially the same size as the valve to freely carry said valve, means for mounting said actuator in said chamber substantially parallel to and spaced from said valve seat and yieldable means connecting said actuator with said lever system.

2. In a liquid meter having an inlet for unmeasured liquid and an outlet for measured liquid, measuring means comprising reciprocable displacement means, a valve chamber connected with said inlet, a planar valve seat in said chamber, conduits for connecting said measuring means and said outlet with ports in said valve seat, a slide valve actuable to different positions on said seat with respect to said ports for controlling the passage of liquid through said conduits, means for actuating said valve comprising an element disposed for actuation by said displacement means, a lever system connected for operation by said element, an actuator provided with an opening of substantially the same size as the valve to freely carry said valve, means for mounting said actuator in said chamber substantially parallel to and spaced from said valve seat, actuator holding pawls, means mounting said pawls for movement to and from engaging relation with said actuator, yieldable means mounted to urge said pawls into actuator engaging relation, said lever system comprising means for alternately releasing said holding pawls as the alternate strokes of said displacement means are completed.

3. In a liquid meter having an inlet for unmeasured liquid and an outlet for measured liquid, measuring means comprising reciprocable displacement means, a valve chamber connected with said inlet, a stationary planar valve seat in said chamber, fixed conduits for connecting said measuring means and said outlet with ports in said valve seat, a slide valve actuable to different predetermined positions on said seat with respect to said ports for controlling the passage of liquid through said conduits, means for actuating said valve comprising an element disposed for actuation by said displacement means, a lever system connected for operation by said element, an actuator for said valve, means mounting said actuator in said chamber for movement substantially parallel with said seat, releasable holding means effective alternately to retain said valve in said predetermined positions, means actuable with said lever system for releasing said effective holding means at the ends of the strokes of said displacement means, said actuator being provided with an opening to receive said valve, said valve being freely movable in said actuator toward and from said seat but constrained by said actuator against movement parallel to said seat, and yieldable means connecting said actuator with said lever system.

4. In a liquid meter having an inlet for unmeasured liquid and an outlet for measured liquid, measuring means comprising reciprocable displacement means, a valve chamber connected with said inlet, a stationary planar valve seat in said chamber, fixed conduits for connecting said measuring means and said outlet with ports in said valve seat, a slide valve actuable to different positions on said seat with respect to said ports for controlling the passage of liquid through said conduits, means for actuating said valve comprising an element disposed for actuation by said displacement means, a lever system connected for operation by said element, an actuator for said valve, means mounting said actuator in said chamber for movement substantially parallel with said seat, resilient means for connecting said lever system to drive said actuator, said actuator being provided with an opening to receive said valve, said valve being freely movable in said actuator toward and from said seat but constrained by said actuator against movement parallel to said seat, yieldable means mounted to urge said valve lightly toward said seat, and means releasable at the ends of the strokes of said displacement means for holding said valve in one or the other of its positions.

5. In a liquid meter having an inlet for unmeasured liquid and an outlet for measured liquid, measuring means comprising reciprocable displacement means, a valve chamber connected with said inlet, a planar valve seat in said chamber, conduits for connecting said measuring means and said outlet with ports in said valve seat, a slide valve actuable to different positions on said seat with respect to said ports for controlling the passage of liquid through said conduits, means for actuating said valve comprising an element disposed for actuation by said displacement means, a lever system connected for operation by said element, an actuator provided with an opening of substantially the same size as the valve to freely carry said valve, means for mounting said actuator in said chamber substantially parallel to and spaced from said valve seat, said lever system comprising a lever provided with a spring support, a spring support on said actuator, and a helical spring looped about one of said supports and anchored on the other of said supports.

6. In a liquid meter having an inlet for unmeasured liquid and an outlet for measured liquid, measuring means comprising reciprocable displacement means, a valve chamber connected with said inlet, a stationary planar valve seat in said chamber, fixed conduits for connecting said measuring means and said outlet with ports in said valve seat, a shaft extending substantially perpendicularly with respect to the plane of said valve seat, said ports being radially equidistantly spaced from said shaft, an actuator mounted for rotation about the axis of the shaft in closely spaced parallel relation with respect to the plane of said seat, an opening in said actuator adapted to loosely receive and control said valve, a lever system connected to be actuated by said displacement means through said shaft and resilient means for connecting said lever system to actuate said actuator.

7. In a liquid meter having an inlet for unmeasured liquid and an outlet for measured liquid, measuring means comprising reciprocable displacement means, a valve chamber connected with said inlet, a valve seat in said chamber, conduits for connecting said measuring means and said outlet with ports in said valve seat, a valve having a seat engaging surface, actuable to different positions on said seat with respect to said ports for controlling the passage of liquid through said conduits, a pressure balancing member provided with a surface parallel to and in spaced relation with said seat, said valve being provided with a second surface which is adapted to sealingly engage the surface of said pressure balancing member, an actuator mounted for movement in parallel spaced relation with respect to said seat and said pressure balancing member, said actuator being provided with an opening of substantially the same size as the valve adapted to freely receive said valve, said valve and actuator having free relative motion toward and from said valve seat but moving together in a direction parallel to said seat, and means for transmitting motion from said displacement means to said actuator.

8. In a fluid meter, measuring means comprising a reciprocable piston, a source of fluid under pressure, conduits for admitting fluid under pressure to said measuring means, an outlet conduit, a valve seat, said conduits terminating in ports of equal area in said valve seat, said ports being formed to provide continuous seat portions of equal circular outline about any two adjacent ports, a circular valve, an actuator for said valve mounted for movement parallel to and in spaced relation with said seat to predetermined positions, said continuous seat portions being disposed to coincide with said valve when said actuator occupies its predetermined positions, and means for transmitting movement from said measuring means to said actuator.

HOSMER L. BLUM.